United States Patent [19]

Kurz, Jr.

[11] 3,843,236

[45] Oct. 22, 1974

[54] SHATTER-RESISTANT MIRROR MOUNTING

[75] Inventor: Arthur W. Kurz, Jr., Birmingham, Mich.

[73] Assignee: Donnelly Mirrors, Inc., Holland, Mich.

[22] Filed: Nov. 24, 1972

[21] Appl. No.: 309,276

[52] U.S. Cl............... 350/288, 296/97 R, 350/305, 350/307
[51] Int. Cl. ............................................. G02b 5/08
[58] Field of Search................... 350/288, 307, 305; 296/97 R, 97 B; 24/209 A, 214; 85/5 R

[56] References Cited
UNITED STATES PATENTS

| | | | |
|---|---|---|---|
| 2,097,419 | 10/1937 | Schmidt | 350/288 X |
| 3,112,547 | 12/1963 | Poe | 85/5 R X |
| 3,375,364 | 3/1968 | Marcus | 350/277 |
| 3,427,096 | 2/1969 | Dykema et al. | 350/288 |
| 3,429,610 | 2/1969 | Bornefeld | 296/97 R |
| 3,611,861 | 10/1971 | Schulze | 85/5 R |
| 3,713,726 | 1/1973 | Magi | 350/288 |

*Primary Examiner*—Ronald L. Wibert
*Assistant Examiner*—Michael J. Tokar
*Attorney, Agent, or Firm*—Price, Heneveld, Huizenga & Cooper

[57] ABSTRACT

A mounting means for removably attaching a shatter-resistant mirror to a padded sun visor located within a vehicle. The mounting means includes at least two projecting mounting studs molded integrally from the resinous material forming a shatter-preventing, integral, backing support for the mirror. The mounting studs each include a leading edge for guiding the stud into an aperture provided in the sun visor, a retaining flange for holding the stud in the aperture, an integral space providing an area into which a portion of the stud may flex during the passage of the stud through the aperture, and a spacing shoulder for spacing the mirror from the sun visor. The length of each stud is such that the visor padding is slightly compressed thereby maintaining the studs under tension and stabilizing the mirror on the sun visor.

17 Claims, 5 Drawing Figures ated out of a person's viewing area to a position near the inside of the roof of an automobile, the vanity mirror will not be visible. These mirrors are thus conveniently located for use by the driver or a passenger in the front seat of an automobile whereby the quick rotation of the sun visor into its operation properly locates the vanity mirror for use by the person.

SHATTER-RESISTANT MIRROR MOUNTING

This invention relates to mounting means for vehicle accessories and attachments and, more particularly, to integral mounting means for removably attaching vanity mirrors to sun visors mounted on a vehicle.

BACKGROUND OF THE INVENTION

Vanity mirrors for mounting on sun visors located within an automobile have long been known in the automobile industry. Such vanity mirrors are typically mounted on the back surfaces of sun visors such that when the sun visor is rotated out of a person's viewing area to a position near the inside of the roof of an automobile, the vanity mirror will not be visible. These mirrors are thus conveniently located for use by the driver or a passenger in the front seat of an automobile whereby the quick rotation of the sun visor into its operation properly locates the vanity mirror for use by the person.

In the past, vanity mirrors have been secured to sun visors by various mounting means. One type of mounting means comprises spring clips secured to the back or lower edge of a vanity mirror and clipped around the bottom edge of a sun visor in order to mount the mirror thereon. Although providing an adequate mounting, such spring clips are visible when the sun visor is rotated to its inoperative position near the roof of the vehicle and are therefore undesirable.

Another type of mounting for vanity mirrors on sun visors is a three-part, stud-socket receiver mounting means. In this apparatus, a small receiving member including a socket formed in a head portion thereof is mounted in an aperture provided in the sun visor. A separate stud member is typically secured to the back of a vanity mirror by means of a metal casing which is contoured to fit over the back of the mirror and includes flanges which are bent away from the mirror to receive and hold the stud in place. The stud mirror is then inserted in the socket of the stud mounted on the sun visor to secure the mirror to the visor. Although forming a mounting which is not visible when the visor is rotated to its inoperative position, this prior mounting means suffers from several disadvantages. Thus, the receiving-socket portion mounted in the sun visor cannot be repeatedly inserted and removed from the sun visor. Also, the stud member is often loosely and insecurely mounted under the flanges of the metallic mirror backing. Finally, the entire assembly is susceptible to separation allowing the mirror to drop from the sun visor after prolonged vibration to which the assembly is subjected in an automobile. Therefore, the stud member portion often separates from the metallic mirror backing, the receivor-socket portion often pulls loose from the sun visor, or the stud portion separates from the receivor-socket portion.

Further, the metallic backed mirrors are unsafe when mounted on the sun visor in that if they fall or if a person's head strikes them in an accident while the visor is rotated to its operative position, severe injury often results due to the rigid, unyielding nature of the metallic backed mirror.

Consequently, it was apparent that none of the previously known mounting means for securing a vanity mirror to a sun visor was sufficient and adequate to mount such a mirror in an aesthetically appealing, vibration proof, safety oriented manner.

SUMMARY OF THE INVENTION

Accordingly, it is an object and feature of the present invention to provide a mirror including a mounting means formed integrally with a backing support means which support means prevents the mirror from tearing or breaking the backing support upon impact.

It is another object and feature of the present invention to provide a shatter-preventing vanity mirror mounting means which is integrally molded with a flexible, shatter-resistant backing for the mirror and which allows the mirror to be repeatedly mounted and removed from a vehicle sun visor.

It is a further object and feature of the present invention to provide a one-piece, integrally mounting means for securing a vanity mirror to a sun visor which will retain the mirror on the visor even under prolonged conditions of severe vibration.

These and other objects and features of the present invention may be accomplished by providing a shatter-preventing vanity mirror assembly for use within vehicles comprising a caseless mirror including in combination a glass base, a reflective film on the base, an integral, self-supporting, shatter-preventing backing support of a resinous material and mounting means molded integrally with the backing support of the caseless mirror and formed from the same resinous material. The resinous backing support is secured to substantially all portions of the glass base with sufficient bonding tenacity in order to allow displacement of portions of the glass base when broken during impact without the breakage or tearing of the resinous backing.

The mounting means basically comprise two projections protruding normally from the back of the mirror for cooperation with two similarly located apertures in the rigid base member of a sun visor located within a vehicle. The projections are inserted through the cooperating apertures and retain the caseless mirror against the padding of the visor while slightly compressing the padding thereby securely supporting and stabilizing the mirror on the visor.

The projections each comprise a mounting stud including a spacing shoulder for spacing the mirror and backing support from the rigid portion of the sun visor including the cooperating apertures, a retaining flange which engages a portion of the opposite side of the sun visor including the apertures, and a connecting member between the spacing shoulder and retaining flange. The retaining flange includes a tapered leading edge which guides the stud into the aperture. The overall length of each stud is such that the mirror is pressed slightly into the padding of the visor. The expanding tendency of the compressed padding thus tends to force the mirror away from the sun visor such that the mounting studs are maintained under tension.

In one form of the invention, the mounting studs include two section connection means comprising cylindrical sections of two different diameters. Thus, when the mounting studs are inserted through the cooperating apertures, the difference in diameter of the two cylindrical sections provides an integral annular space into which the retaining flange may flex to allow the stud to pass through the aperture. In another form of the invention, the mounting studs include a connecting cylinder of a single diameter in addition to a central, internal opening through the entire length of the mounting stud, which central opening also provides an integral space into which portions of the stud may flex during the mounting of the mirror. In either form of the invention, the tough, flexible, resinous material from which the mounting studs are formed allows the retaining portions of the studs to be repeatedly flexed without damaging the resiliency of the studs. Consequently, the vanity mirror may be repeatedly mounted and removed from the sun visor without sacrificing any of its superior retention qualities.

These and other objects, advantages and features of the invention will become apparent from a study of the following description taken in conjunction with the drawings.

DESCRIPTION OF THE PREFERRED EMBODIMENT

Figure 1:
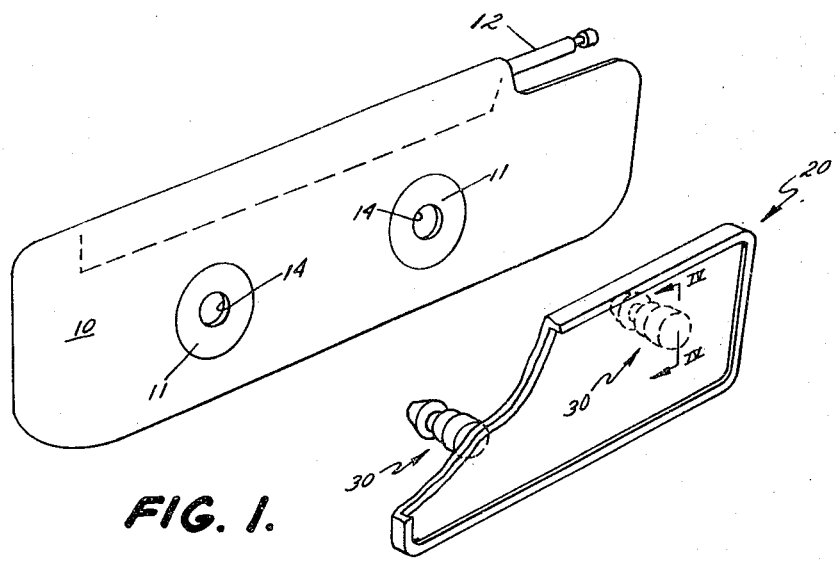
FIG. 1 is a perspective view of a padded sun visor on which is mounted a shatter-preventing vanity mirror which is partially broken away to reveal the present novel integral mounting means molded on the back thereof.

Referring now to the drawings in greater detail, FIG. 1 shows a padded sun visor 10 of the type commonly used on automobiles. The sun visor 10 may be rotatably mounted near the roof of the vehicle adjacent the windshield thereof by means of a support rod 12 mounted on a suitable support means (not shown). A caseless, shatter-preventing vanity mirror 20 including one embodiment 30 of the present novel mounting means molded integrally on the back thereof is shown relative to a pair of mounting apertures 14 formed in the visor 10. When in use, the mirror 20 will be snapped onto the padded visor 10 by means of the mounting means 30 which cooperate with the apertures 14. The mounting means 30 allow for repeated mounting and removal of the mirror 20 from the padded visor 10 without altering the structural integrity or resiliency of either the mirror or the mounting means. When in place, the mirror will be securely supported and stabilized by the padding on the visor thereby preventing any looseness or vibration of the mirror 20 with respect to the visor 10.

The shatter-resistant vanity mirror is of the type described in U.S. Pat. No. 3,427,096, issued Feb. 11, 1969, to J. A. Dykema et al., the contents of which are incorporated by reference herein. Generally speaking, the shatter-resistant vanity mirror is produced by tightly bonding and sealing a fused, polyvinyl chloride, resin support backing 22 to a glass base 24 having a metallic reflective film 26 thereon. The fused resin layer 22 is bonded to the glass with sufficiently high bonding tenacity to retain all fragments of glass from the glass base in the event of breakage under impact. The bonding tenacity is obtained by using an adhesion-promoting primer resin applied directly to the glass or to the metallic reflective film applied thereon depending on whether the mirror is a first or second surface mirror. At least a substantial portion of the resin backing 22 has a predetermined thickness of sufficient dimension to provide the sole support for the glass base 24. Consequently, the tightly bonded resin will have sufficient flexibility, integral strength, and toughness to allow displacement of portions of the glass when broken under impact without breakage of the resin backing.

Figure 2:
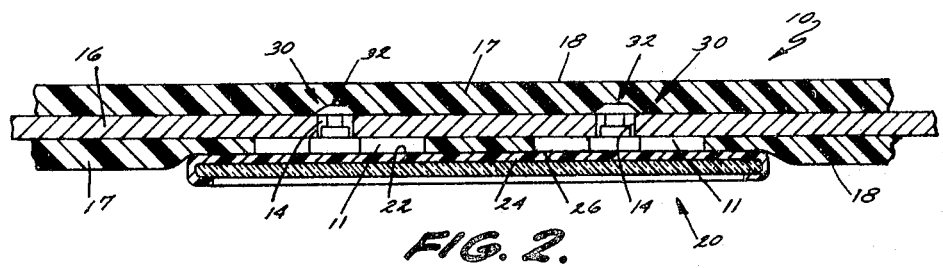
FIG. 2 is a fragmentary, cross-sectional view of the mirror apparatus shown in FIG. 1 when mounted on a padded sun visor, said mirror including one embodiment of the novel mounting means.

Referring now to FIG. 2, the mounting means 30 comprise two mounting projections or studs 32 which are molded integrally with the shatter-resistant, resinous backing support 22 of the shatter-resistant vanity mirror 20. The studs 32 are spaced apart on the back of the mirror and cooperate with correspondingly located apertures 14 formed in the rigid supporting body 16 of the visor 10. The supporting body 16 of visor 10 is covered on both surfaces with a thin layer of padding 17 comprising foam, fibers, a combination thereof, or other similar materials which are easily compressible. The foam layers 17 are in turn covered by a thin layer 18 of vinyl or leather to give a finished appearance to the padded sun visor 10.

The padding surrounding the apertures 14 on one surface of the rigid body 16 is cut away to provide a sufficient area 11 for the studs 32 to be inserted in apertures 14. When inserted in apertures 14, studs 32 will securely retain the mirror 20 against padding 17 on one surface of the visor 10. The padding 17 under the mirror 20 will be slightly compressed due to the predetermined length of studs 32 which are slightly shorter than the combined thicknesses of the rigid body 16 and the uncompressed padding 17. Consequently, the expanding tendency of the slightly compressed padding 17 working against the back of the mirror tends to push or force the mirror away from the rigid body 16 and against the retaining action of the studs 32, thereby maintaining the studs 32 in tension and securely supporting and stabilizing the mirror on the padded visor.

Figure 4:
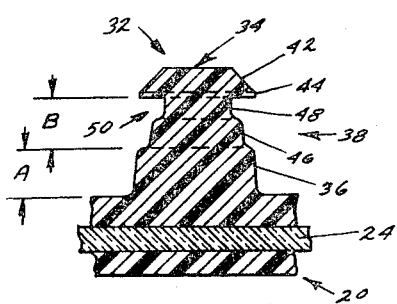
FIG. 4 is an enlarged fragmentary, cross-sectional view of the integral mounting means shown in FIGS. 1 and 2.

As is best shown in FIG. 4, each of the mounting studs or projections 32 includes three main integral sections comprising a retaining means or head 34, a spacing means or shoulder 36, and a connecting means or member 38. The head 34 includes a tapered or inclined leading edge 42 which guides the stud 32 into the aperture 14 and a retaining flange 44 which contacts the surface of the rigid supporting member 16 around the periphery of the aperture 14. On the opposite surface of the rigid support member 16, the spacing shoulder 36 typically contacts the periphery around the aperture 14 directly opposite the area contacted by the retaining flange 44. The spacing shoulder, having a length A shown in FIG. 4 which is slightly less than the uncompressed thickness of padding layer 17, thus provides a substantial base or support for mirror 20 extending directly between the mirror 20 and the rigid support member 16. However, as explained below, the shoulders 36 need not be in direct contact with this periphery to stably support the mirror. Retaining flange 44 and spacing shoulder 36 both have equivalent cross-sectional areas which are larger than that of apertures 14 thereby providing sufficient area for contacting the periphery of the apertures.

Head 34 and spacing shoulder 36 are joined by an integral connecting member 38 having a maximum cross-sectional area which is slightly smaller than that of the apertures 14. The length B (FIG. 4) of member 38 is approximately equivalent to the thickness of rigid member 16. Accordingly, the connecting member 38 will fit through the apertures 14 and, when the mirror 20 is in place on the visor 10, the connecting member 38 will be entirely surrounded by the inside of aperture 14.

In this connection, rigid member 16 will vary slightly in thickness from visor to visor. Thus, the length B of member 16 is sufficient to accommodate a range of thicknesses of members 16 around a standard or typical thickness for members 16. Further, this approximate length B means that on some visors fitted with mirrors 20, connecting member 38 will be longer than the thickness of member 16. Accordingly, the outwardly expanding tendency of slightly compressed padding 17 will pull retaining flange 44 tightly into contact with the back surface of member 16. Consequently, spacing shoulder 36 is pushed slightly away from the opposite surface of member 16. In this case, the padding stabilizes the mirror 20 on the visor 10, the spacing shoulder providing rigidity and support for the stud 32. Thus, lengths A and B are approximate and accommodate varying thicknesses of rigid members 16 and padding of layers 17. Further, spacing shoulders 36 need not be in direct contact with members 16 to stably support the mirror 20.

In the preferred embodiment, connecting member 38 comprises two sections having different cross-sectional areas. The first section 46 projects normally outwardly from the spacing shoulder 36 and has a cross-sectional area slightly less than that of the apertures 14. The second connecting section 48 extends between the first connecting section 46 and head 34 and has a cross-sectional area slightly less than that of the first section 46. The difference in the cross-sectional areas of sections 46 and 48 provides an area or integral space 50, shown in FIG. 4, into which the retaining flange 44 may flex when studs 32 are forced through aperture 14 when the mirror 20 is mounted on visor 10. However, after the stud 32 has been forced fully into aperture 14, i.e., when spacing shoulder 36 is forced against rigid body 16, retaining flange 44 will snap out around the periphery of aperture 14 and the space 50 will become open and the first section 46, being slightly smaller than the size of the aperture 14, will allow only a minimum of play or movement of the connecting member within the aperture 14. As mentioned above, the length of connecting member 38 is approximate that of rigid member 16. The slight extra length of member 38 allows head 34 to be pushed past aperture 14 during assembly such that flange 44 easily snaps out and around the periphery of the aperture.

Further, the apertures 14 and the mounting studs 32 have circular cross sections in the preferred embodiment. Thus, head 34 is a truncated cone tapering radially outwardly from its extreme flat end toward the back of the mirror 20 and ending in the retaining flange 44 which has a maximum diameter slightly larger than the diameter of the aperture 14. The leading edge 42 is the inclined surface between the retaining flange 44 and the extreme flat end of the head 34. The spacing shoulder 36 is a cylindrical extension extending normally from the backing support of the mirror 20 and having a diameter equal to that of the retaining flange 44, i.e., slightly larger than that of aperture 14. First connecting section 46 is a cylindrical extension extending outwardly from spacing shoulder 36 and having a diameter slightly less than aperture 14. Second connecting section 48 is a cylinder extending between first section 46 and head 34 and having a diameter slightly less than that of first section 46. Thus, area 50 is an annular space into which the annular retaining flange 44 may flex during the mounting of the mirror 20.

As mentioned above, the effective length of the mounting stud 32 is slightly less than the combined thicknesses of the rigid support member 16 and uncompressed padding layer 17. The effective length of the stud 32 is comprised of two sections, namely, the height A of the spacing shoulder 36, as shown in FIG. 4, and the combined height B of the first and second connecting sections 46 and 48. The effective height of the stud 32, i.e., A plus B, is slightly less than the thicknesses of member 16 and uncompressed layers 17 and 18. Consequently, when the mirror 20 is mounted to sun visor 10, the backing support of mirror 20 will be forced into the padding layer 17 of visor 10 at all areas under the mirror 20. This results in a slight compression of the pad 17 which in turn results in the stabilizing support of the mirror 20 on visor 10 due to the expansion tendency of the padded layer.

DESCRIPTION OF THE ALTERNATIVE EMBODIMENT

Figure 3:
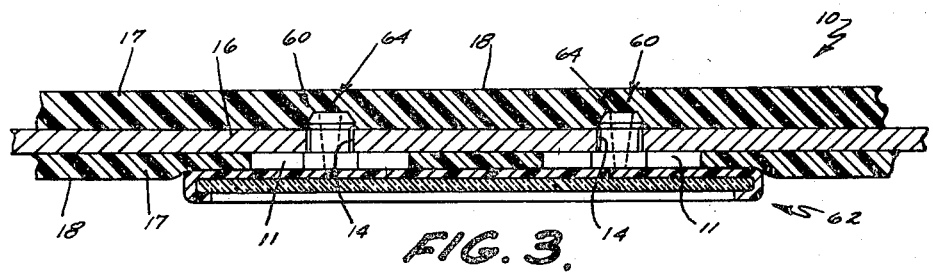
FIG. 3 is a fragmentary, cross-sectional view of a mirror apparatus similar to that shown in FIG. 1 also when mounted on a padded sun visor, but including another embodiment of the novel mounting means.
Figure 5:
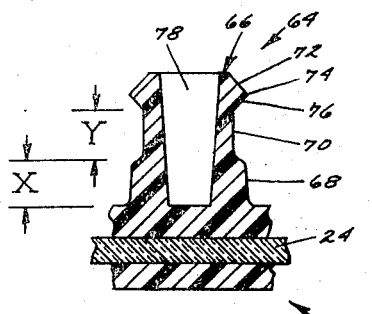
FIG. 5 is an enlarged, cross-sectional, fragmentary view of the integral mounting means shown in FIG. 3.

Referring now to FIGS. 3 and 5, an alternative embodiment 60 of the present novel mounting means is shown. As shown in FIG. 3, a shatter-resistant, caseless mirror 62 which is similar in all respects to mirror 20 described above, except for mounting means 60, is shown mounted on a padded sun visor 10 of the type described above. Mounting means 60 comprise two mounting projections or studs 64 molded integrally with the backing support of mirror 62 as were the studs 32 of mirror 20 described above, and are spaced to correspond to similarly located apertures 14 provided in rigid base member 16 of visor 10. Studs 64 also have an effective length slightly less than the combined thicknesses of the rigid member 16 and uncompressed padding layer 17 and 18 such that when the mirror 62 is mounted on visor 10, the padding layers will be slightly compressed causing the mirror to be stably supported in a manner similar to that described above for mirror 20.

As shown in FIG. 5, the studs 64 have a different configuration than studs 32 although the function of both is based on the same principle. Stud 64 comprises a head 66, a spacing shoulder 68 and a connecting member 70. Head 66 includes a leading edge 72 which tapers outwardly toward the back of mirror 62 and ends in a retaining flange 74. Additionally, stud 64 includes an inclined or tapered trailing edge 76 which contacts the edge of aperture 14 when the mounting stud is in place and provides a means for camming or flexing the retaining flange 74 radially inwardly when the mounting stud is removed from the aperture 14 in visor 10. Stud 64 also includes a tapered hole 78 which extends from the top of head 66 to the bottom of spacing shoulder 68 and provides an integral space into which portions of head 66, including retaining flange 74, may be flexed during the mounting and removal of the mounting studs 64 from visor 10. Hole 78 is tapered from its maximum cross-sectional area at head 66 to its minimum cross-sectional area at its bottom or closed end at the bottom end of spacing shoulder 68.

In the preferred embodiment of stud 64, the various portions of the stud are circular in cross section. Head 66 comprises two integral truncated cones which taper toward one another, as shown in FIG. 5, one tapering radially outwardly from the extreme flat end of stud 64 toward mirror 62, including leading edge 72 and ending in annular retaining flange 74, and the other tapering radially outwardly from connecting member 70, toward retaining flange 74 and including trailing edge 76. Annular retaining flange 74 has a maximum diameter slightly greater than that of apertures 14 and equal to that of spacing shoulder 68. Connecting member 70 is a cylinder connecting head 66 with spacing shoulder 68 and having a diameter slightly less than that of apertures 14. The length of connecting cylinder 70 equals the approximate thickness of rigid member 16 and is represented by Y in FIG. 6, while X represents the length of shoulder 68 which is slightly less than the thickness of uncompressed layer 17. The effective, combined lengths X plus Y of the shoulder 68 and cylindrical member 70 is therefore less than the combined thicknesses of the rigid member 16 and padding layer 17 and vinyl covering 18. Consequently, when the mirror 62 is mounted on the visor, the mirror will slightly compress the padding layer 17 and be retained in that position by the retaining flange 74, as shown in FIG. 3, thereby maintaining the mirror 62 securely and stably on the visor 10. Further, as described above, in connection with studs 32, shoulders 68 need not directly contact the surface of rigid members 16. Thus, the mirror is stably supported even with shoulders 68 spaced slightly from member 16 due to any extra length of connecting member or section 70.

It is apparent then that the integral molding of the mounting studs on the back of the mirror from the tough, flexible, resinous material used to encase the mirror allows the repeated mounting and removal of the mirror on the visor without damaging the structure of the mounting means. Further, the heads of the respective mounting studs will protrude only slightly into the inner portion of the padding on the opposite side of the rigid member 16 thereby causing no protrusion on the front surface of the visor 10 opposite the side on which the mirror is mounted. Consequently, the present novel mounting means 30 and 60 provide an aesthetically pleasing means for removably securing a vanity mirror to a padded sun visor. The mirror will be securely retained on the visor even when subjected to long periods of vibration, will not be visible in any way from the front of the visor, and will provide a safety mirror that will resist shattering and flex if the mirror should be struck during an accident.

While several forms of the invention have been shown and described, other forms will now be apparent to those skilled in the art. Therefore, it will be understood that the embodiments shown in the drawings and described above are merely for illustrative purposes and are not intended to limit the scope of the invention which is defined by the claims which follow.

The embodiment of the invention in which an exclusive property or privilege is claimed are defined as follows:

1. In a shatter-resistant mirror assembly for use within vehicles comprising a caseless mirror including in combination a glass base; a reflective means on said base; a solid body forming an integral, self-supporting, shatter-preventing, backing support of a resinous material having at least a substantial portion thereof a predetermined thickness of sufficient dimension to provide the sole support for said mirror, said backing support being secured to substantially all portions of the back of said mirror with sufficient high bonding tenacity to tightly retain all fragments of glass on said support in the event of breakage under impact, the composition of said resinous material being such that when said backing support has said predetermined thickness, it will have sufficient flexibility, integral strength, and toughness to allow displacement of portions of said glass when broken under impact without breakage or tearing of the resin backing; the improvement comprising mounting means molded integrally with said backing support from said resinous material for mounting said mirror to a support located within said vehicle; said mounting means including at least one projection extending outwardly of said backing support and having flexible retaining flange means for passing into and engaging a portion of means defining an aperture approximating the external dimension of said projection in a support on a vehicle and retaining said assembly to the support after such passage, said retaining flange means having a width dimension greater than the width of said aperture and including means for flexing during passage through said aperture whereby said retaining flange means expand to its original configuration after passage through said aperture and engage said portion of said means defining said aperture.

2. An assembly as described in claim 1 wherein said mounting means include at least two flexible mounting studs projecting from said backing support; said studs each including said flexible retaining flange means, spacing means for spacing said backing support and mirror from the vehicle support; and constricted means for connecting said spacing and retaining flange means.

3. An assembly as described in claim 2 wherein the vehicle support is of the type having two surfaces and a predetermined thickness and includes two apertures bored therethrough and located to correspond to the positions of said studs on said backing support; said retaining flange means including guide means for guiding said studs into said apertures.

4. An assembly as described in claim 3 wherein said spacing means are larger than the apertures of the vehicle support; said constricted means extending through the apertures while said retaining means contact the one surface of the vehicle support around the periphery of the apertures thereby securely fastening said mirror to the vehicle support.

5. An assembly as described in claim 4 wherein the apertures are circular holes each having a predetermined diameter; said spacing means comprise cylindrical extensions from said backing support each having a diameter larger than the diameter of the apertures; said retaining flange means comprise conical heads including flexible flanges extending radially outwardly therefrom, said flanges each having a diameter slightly larger than that of the apertures; the inclined surface of said conical head comprising said guide means; and said constricted means comprise connecting cylinders each having a diameter less than the apertures, said connecting cylinders extending between said cylindrical extensions and conical heads.

6. The combination of a vehicle sun visor located in a vehicle and a caseless vanity mirror removably mounted on said sun visor, said sun visor including a rigid support member having a predetermined thickness; two planar surfaces, at least one aperture bored therethrough, and a layer of compressible padding covering each of said surfaces except for areas surrounding said aperture on one of said surfaces; said caseless vanity mirror comprising a transparent base; a reflective film on said base; a solid body forming an integral, shatter-preventing backing support of resinous material; and mounting means formed integrally from said resinous material on said backing support and cooperating with said aperture for removably securing said caseless mirror to said sun visor; said mounting means including a projection having a retaining flange spaced from said backing support a distance less than the total thickness of said rigid support member of said sun visor and said layer of padding when uncompressed on one side of said rigid support member whereby said padding is compressed when said mirror is secured to said visor by said retaining flange engaging the edge of said aperture, and the natural, expensive tendency of said padding against said mirror stabilizes and prevents vibration of said mirror on said visor.

7. The combination of claim 6 wherein said projection is a flexible stud protruding from said backing support; said stud including a shoulder extending a distance less than the uncompressed thickness of said layer of padding on said one surface and having a cross-sectional area larger than that of said aperture, said stud further including a retaining head having guide means for guiding said stud into said apertures and said retaining flange means which includes an annular flange extending beyond the edges of said aperture, said padding tending to push said mirror away from said visor thereby maintaining said tension on said stud.

8. The combination of claim 7 wherein said stud further includes connecting means between said shoulder and said retaining head, said connecting means extending through said aperture and having a cross-sectional area less than said aperture and a length approximately equal to the thickness of said rigid support member.

9. The combination of claim 8 wherein said aperture is a circular hole having a predetermined diameter; said shoulder is a cylinder having a diameter greater than that of said hole; said retaining head is a cone, the largest portion of said cone comprising an annular flange having a diameter greater than that of said hole; and said guide means comprise the inclined surface of said cone.

10. The combination of claim 9 wherein said connecting means comprises two cylinders having a combined length approximately equal to said thickness of said rigid support member; the first of said two cylinders extending from said cylindrical shoulder and having a diameter slightly less than that of said hole; the second of said two cylinders extending between said first cylinder and said retaining head and having a diameter sufficiently less than said first cylinder whereby an annular space is provided into which said annular flange flexes when said stud is forced through said hole.

11. The combination of claim 9 wherein said connecting means comprise a cylinder extending between said cylindrical shoulder and said retaining head; said retaining head comprising a truncated cone having its largest diameter portion joined to said cylindrical connecting means; said annular flange on said retaining head having its surface adjacent said cylinder inclined from the extremity of said flange to the circumference of said cylindrical connecting means; and said stud including a central, conical opening therethrough from said backing support through said retaining head; said conical opening being smallest at said backing support.

12. A shatter-resistant vanity mirror including an integral backing support securely bonded to substantially all portions of the back of a mirror; said mirror comprising a transparent base having a reflective coating on a surface thereof; said backing support comprising a flexible, tough, resinous material; said mirror further including protruding mounting means integral with said backing support and molded from said resinous material; said mounting means including a projection extending outwardly of said backing support, said projection including flexible, retaining, flange means adjacent the free end thereof adapted to flex during passage through an aperture in a support on a vehicle but to expand to engage the edge of such aperture to retain said mirror on the support after such passage, said projection further including means defining an integral space into which said retaining flange means flexes during such passage to allow said flange to pass through said aperture.

13. A shatter-resistant vanity mirror as described in claim 12 wherein said protruding mounting means comprise at least two of said projections spaced along said backing support and projecting perpendicularly therefrom; said projections each including a spacing means for supporting and spacing said mirror from a supporting surface.

14. A shatter-resistant vanity mirror as described in claim 13 wherein said resinous material is a polymer of vinyl chloride; said secure bond between said backing support and said back of said mirror being provided by an adhesion promoting resin polymer coating between said vinyl chloride polymer backing support and said transparent base.

15. A shatterproof vanity mirror as described in claim 13 wherein said projections further include a constricted connecting means between said spacing means and said retaining means; and said retaining flange means includes integral guide means for guiding said projections into mounting apertures provided in said supporting surface for receiving said projections.

16. A shatterproof vanity mirror as described in claim 15 wherein said spacing means is a cylindrical extension of a predetermined diameter; said retaining flange means comprises a conical head tapering radially outwardly toward said mirror and ending in a flexible annular flange comprising said portion of said mounting means which is flexed during the mounting of said mirror, said flange having a diameter equal to that of said cylindrical extension; said guide means comprise the tapered surface of said conical head; said connecting means including two cylindrical sections; the first section having a diameter less than said cylindrical extension; the second section having a diameter less than said first section; the difference in said diameters of said two sections providing an annular space comprising said integral space into which said flange is flexed during the mounting of said mirror.

17. A shatterproof vanity mirror as described in claim 15 wherein said spacing means is a cylindrical extension of a predetermined diameter; said retaining flange means comprises a truncated conical head tapering radially outwardly toward said mirror and ending in a flexible annular flange comprising said portion of said mounting means which is flexed during the mounting of said mirror, said flange having a maximum diameter equal to that of said cylindrical extension; said guide means comprise the tapered surface of said conical head; said connecting means comprising a connecting cylinder having a diameter slightly less than that of said cylindrical extension; said truncated conical head including an underside closest to said mirror, said underside being inclined away from said mirror from said connecting cylinder to the extremity of said annular flange; said projections further including a central tapered opening along the entire length thereof, said opening having its greatest diameter at said truncated conical head; said opening comprising said integral space into which said flange is flexed during mounting.

* * * * *